(12) United States Patent
Colebrooke

(10) Patent No.: US 11,319,896 B2
(45) Date of Patent: May 3, 2022

(54) EXHAUST NOZZLE

(71) Applicant: ROLLS-ROYCE plc, London (GB)

(72) Inventor: Jack F. Colebrooke, Bristol (GB)

(73) Assignee: Rolls-Royce PLC, London (GB)

(*) Notice: Subject to any disclaimer, the term of this patent is extended or adjusted under 35 U.S.C. 154(b) by 0 days.

(21) Appl. No.: 17/072,495

(22) Filed: Oct. 16, 2020

(65) Prior Publication Data

US 2021/0131378 A1     May 6, 2021

(30) Foreign Application Priority Data

Oct. 31, 2019   (GB) .................................... 1915793

(51) Int. Cl.
   *F02K 1/12*     (2006.01)
   *F02C 7/00*     (2006.01)

(52) U.S. Cl.
   CPC .................. *F02K 1/12* (2013.01); *F02C 7/00* (2013.01); *F05D 2220/32* (2013.01)

(58) Field of Classification Search
   CPC ..... F02K 1/06; F02K 1/08; F02K 1/12; F05D 2220/32; F02C 7/00
   See application file for complete search history.

(56) References Cited

U.S. PATENT DOCUMENTS

| | | | |
|---|---|---|---|
| 2,794,317 A | 6/1957 | Brown | |
| 2,806,349 A * | 9/1957 | Yeager | F02K 1/1207 239/455 |
| 2,931,169 A * | 4/1960 | Glenn | F02K 1/1238 239/455 |
| 3,004,385 A | 10/1961 | Spears, Jr. et al. | |
| 3,643,868 A * | 2/1972 | McMurtry | F02K 1/1253 239/265.39 |

(Continued)

FOREIGN PATENT DOCUMENTS

| | | |
|---|---|---|
| EP | 0748932 A1 | 12/1996 |
| EP | 0851110 A2 | 7/1998 |

(Continued)

OTHER PUBLICATIONS

Great Britain search report dated Feb. 18, 2020, issued in GB Patent application No. 1915793.2.

(Continued)

*Primary Examiner* — Craig Kim
(74) *Attorney, Agent, or Firm* — Shumaker & Sieffert, P.A.

(57) ABSTRACT

There is disclosed an exhaust nozzle for a gas turbine engine, the exhaust nozzle comprising a frame extending along a longitudinal axis. The exhaust nozzle comprises a convergent petal pivotably attached at a convergent pivot point to the frame and extending axially downstream and radially inward from the frame, a follower roller fixed to the convergent petal on a radially outer side of the convergent petal, and a cam defining a working surface configured to engage the follower roller to react a force from the convergent petal. The cam is movable along a travel in an axial direction to actuate radial movement of the follower roller to pivot the convergent petal. The cam defines a concave working surface such that a contact angle between the follower roller and the cam varies along the travel to thereby vary a radial component of the force reacted by the cam.

12 Claims, 3 Drawing Sheets

(56) References Cited

U.S. PATENT DOCUMENTS

| | | | |
|---|---|---|---|
| 3,807,637 A | 4/1974 | Camboulives et al. | |
| 3,873,027 A | 3/1975 | Camboulives et al. | |
| 4,784,326 A | 11/1988 | Honeycutt, Jr. | |
| 4,994,660 A * | 2/1991 | Hauer | F02K 1/008 239/265.41 |
| 5,111,550 A | 5/1992 | Leblanc | |
| 5,150,839 A * | 9/1992 | Reedy | F02K 1/008 239/265.41 |
| 5,779,152 A * | 7/1998 | Renggli | F02K 1/008 239/265.33 |
| 6,195,981 B1 * | 3/2001 | Hanley | F02K 1/008 239/265.35 |
| 6,276,126 B1 * | 8/2001 | Bouiller | F02K 1/008 239/265.41 |
| 9,650,991 B2 * | 5/2017 | Jasklowski | F02K 1/18 |
| 10,371,093 B2 * | 8/2019 | Baker | F02K 1/15 |
| 2004/0065502 A1 * | 4/2004 | Yamamoto | F02K 1/1223 181/214 |
| 2005/0086927 A1 * | 4/2005 | Lair | F02K 1/72 60/226.2 |
| 2005/0103933 A1 * | 5/2005 | Lair | B64D 33/06 244/110 B |
| 2005/0126174 A1 * | 6/2005 | Lair | F02K 3/075 60/771 |
| 2005/0151012 A1 * | 7/2005 | Lair | F02K 1/763 244/110 B |
| 2012/0199670 A1 * | 8/2012 | Jardine | F02K 1/06 239/265.19 |
| 2016/0333725 A1 | 11/2016 | Peters et al. | |
| 2020/0025133 A1 * | 1/2020 | Watson | F02K 1/09 |
| 2021/0131379 A1 * | 5/2021 | Colebrooke | F02K 1/1207 |
| 2021/0222647 A1 | 7/2021 | Colebrooke | |
| 2021/0262415 A1 * | 8/2021 | Sidelkovskiy | F02K 1/1207 |

FOREIGN PATENT DOCUMENTS

| | | |
|---|---|---|
| EP | 1045129 | 10/2000 |
| EP | 3336340 A1 | 6/2018 |
| GB | 760519 | 10/1956 |
| GB | 851225 | 10/1960 |
| GB | 871265 | 6/1961 |
| GB | 907526 A | 10/1962 |
| GB | 958307 | 5/1964 |
| GB | 1456280 | 11/1976 |
| GB | 1551216 A | 8/1979 |

OTHER PUBLICATIONS

Great Britain search report dated Feb. 18, 2020, issued in GB Patent application No. 1915792.4.

Great Britain search report dated Feb. 27, 2020, issued in Great Britain application No. 1915790.8.

European search report dated Mar. 3, 2021, issued in EP patent application No. 20202608.

European search report dated Mar. 3, 2021, issued in EP patent application No. 20202609.

European search report dated Mar. 2, 2021, issued in EP patent application No. 20202607.

Response to Extended European Search Report from counterpart EP Application No. 20202609.2 dated Mar. 3, 2021, filed Nov. 5, 2021, 36 pgs.

* cited by examiner

EXHAUST NOZZLE

CROSS-REFERENCE TO RELATED APPLICATIONS

This disclosure is based upon and claims the benefit of UK Patent Application No. GB 1915793.2, filed on 31 Oct. 2019, the entire contents which are hereby incorporated herein by reference.

BACKGROUND

Technical Field

The present disclosure relates to an exhaust nozzle for a gas turbine engine, and a gas turbine engine comprising the exhaust nozzle.

Description of the Related Art

Gas turbine engines may use a variable geometry convergent-divergent (con-di) exhaust nozzle to maximise the production of thrust. A typical exhaust nozzle comprises a plurality of convergent petals which can be pivoted to converge, to reduce the size of an area for air flow exhausting from the engine.

SUMMARY

According to a first aspect of the disclosure, there is provided an exhaust nozzle for a gas turbine engine, the exhaust nozzle comprising a frame extending along a longitudinal axis and the exhaust nozzle comprising: a convergent petal pivotably attached at a convergent pivot point to the frame and extending axially downstream and radially inward from the frame; a follower roller fixed to the convergent petal on a radially outer side of the convergent petal; and a cam defining a working surface configured to engage the follower roller to react a force from the petal; wherein the cam is movable along a travel in an axial direction to actuate radial movement of the follower roller to pivot the convergent petal, whereby the cam defines a concave working surface such that a contact angle between the follower roller and the cam varies along the travel to thereby vary a radial component of the force reacted by the cam.

A concave cam is intended to mean a cam having a curved profile, where the centre of curvature is radially inward in the nozzle from the cam.

The exhaust nozzle may comprise a divergent petal pivotably attached at a divergent pivot point to a downstream end of the convergent petal, the divergent petal extending axially downstream and radially outward from the divergent pivot point.

The divergent petal may be connected to the frame by a linkage such that the frame, convergent petal, divergent petal and linkage form a four-bar linkage.

The linkage may be a thrust linkage which is actuatable to change length.

The convergent petal may define a chord length from the convergent pivot point to the divergent pivot point. The roller may be fixed between 40-80% along the chord length of the convergent petal from the convergent pivot point.

The cam may be moveable between a contracted position in which the cam is in a furthest upstream position and an expanded position in which the cam is in a furthest downstream position. The cam may be configured so that a contact angle between the cam and the follower roller in the expanded position is between 80-100 degrees from the longitudinal axis, preferably between 85-95 degrees from the longitudinal axis.

A ratio of a radius of the follower roller to an average radius of curvature of the cam may be 0.05 or above. A ratio of a radius of the follower roller to a maximum radius of curvature of the cam may be 0.2 or below.

The exhaust nozzle may comprise a plurality of convergent petals angularly distributed around the exhaust nozzle, each comprising respective rollers, and the exhaust nozzle comprising a corresponding plurality of cams circumferentially spaced around the exhaust nozzle and configured to maintain engagement with a respective roller.

The cam may be fixed to a unison ring. Axial movement of the cam may be actuated by axial movement of the unison ring.

There may be a plurality of divergent petals corresponding to the plurality of convergent petals.

According to a second aspect of the disclosure, there is provided a gas turbine engine comprising an exhaust nozzle in accordance with the first aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
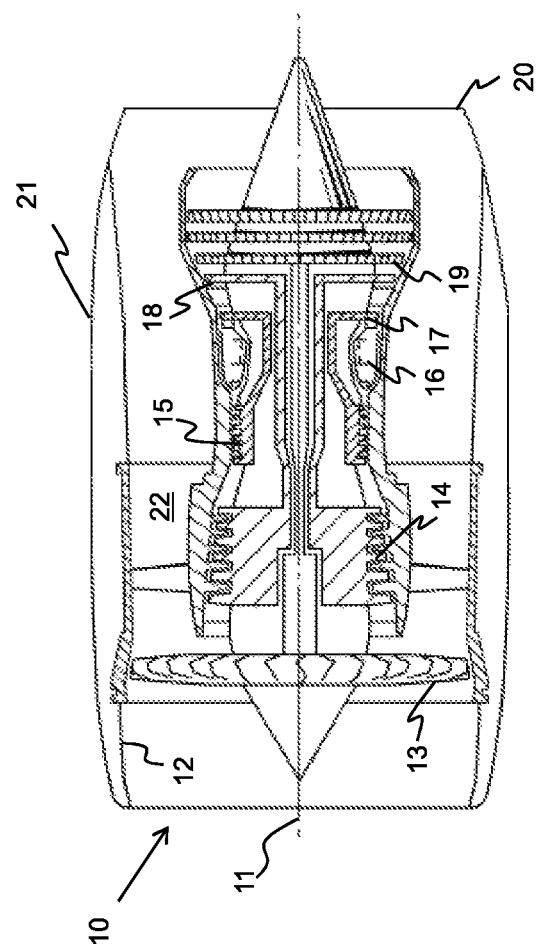
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
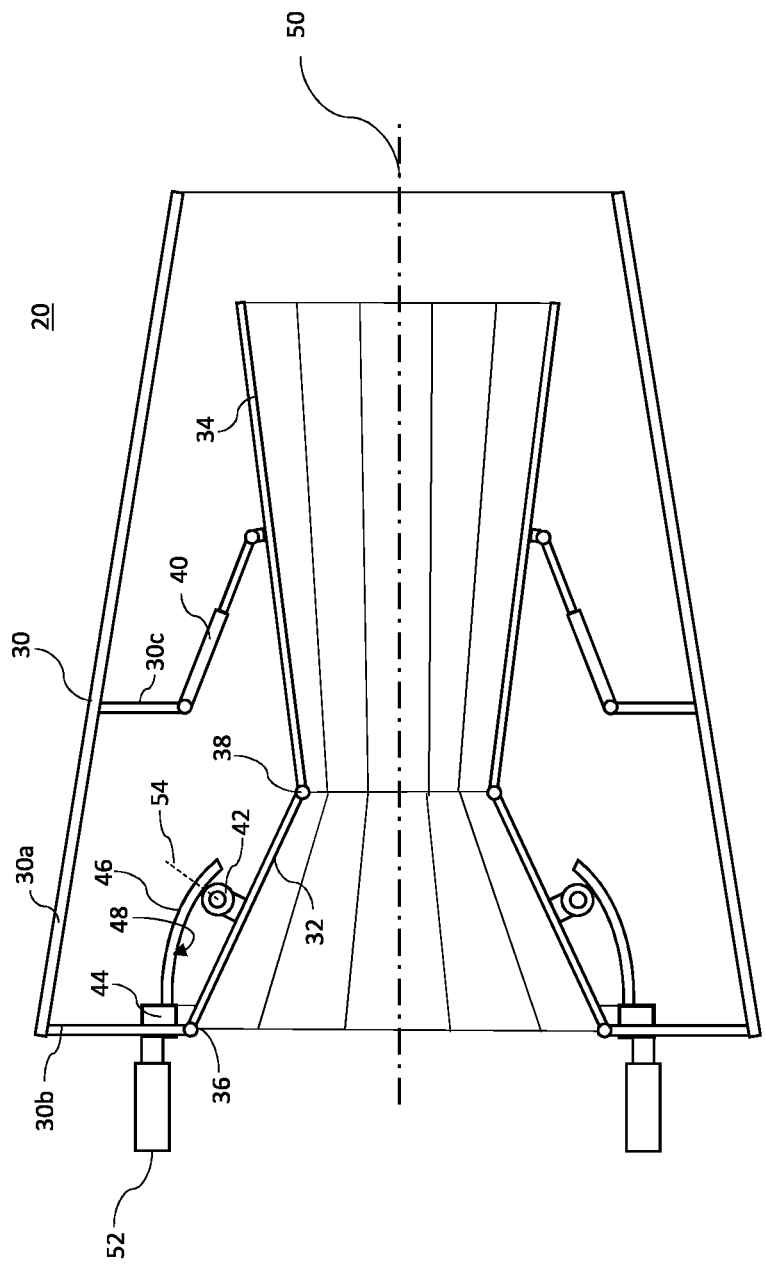
FIG. 2 schematically shows a longitudinal cross-section of an example exhaust nozzle in a contracted configuration.

FIG. 2 shows an example exhaust nozzle 20 having a variable converging-diverging (con-di) exhaust in a contracted configuration. In other examples, the exhaust nozzle may only have a variable converging exhaust, without a divergent section.

The nozzle 20 comprises a radially outer support frame 30 extending from an upstream end (left side in the Figures) to a downstream end (right side in the Figures) along a longitudinal axis 50, which is coaxial with the rotational axis 11 of the gas turbine engine 10 described with reference to FIG. 1, when the nozzle 20 is mounted in the gas turbine engine 10. The frame 30 comprises an annular portion 30a which is coaxial with the longitudinal axis 50 and which converges from the upstream end to the downstream end (i.e. the radius of the annular portion 30a reduces in a downstream direction along the longitudinal axis 50).

The nozzle 20 comprises a plurality of convergent petals 32 which are angularly distributed about the longitudinal axis 50 within the nozzle 20 at an upstream end of the nozzle 20, and a corresponding plurality of divergent petals 34 which are angularly distributed about the longitudinal axis 50 within the nozzle 20 downstream of (and connected to) the plurality of convergent petals 32. The plurality of convergent petals 32 and divergent petals 34 are configured to provide a converging and then diverging cross-sectional area for air flow exhausting from the gas turbine engine 10, for example to choke the flow and achieve supersonic exit velocities in the divergent section.

The extent of convergence of the convergent petal 32 and the extent of divergence of the divergent petal 34 is variable, as will be explained in detail below. In the contracted configuration, the convergent petal 32 is in a contracted position in which it is at a maximum convergence (i.e. it reduces the air flow area to a minimum along the longitudinal axis 50). In this example, the convergent petal 32 in the contracted position is angled radially inwardly at an angle of approximately 40 degrees with respect to the longitudinal axis 50 (with the frame of reference being such that 0 degrees would correspond to the convergent petal 32 being parallel with the longitudinal axis 50). In other examples, the angle of the convergent petal with respect to the longitudinal axis in the contracted position may be less than 40 degrees, such as 35 degrees or 30 degrees.

The configuration of each convergent petal 32 and respective divergent petal 34 is identical, and as such it will be described below with respect to a single convergent petal 32 and respective divergent petal 34.

The frame 30 comprises a first extension 30b extending radially inwards from the annular portion 30a of the frame 30 at an upstream end of the frame 30. The convergent petal 32 is pivotably attached to the first extension 30b at a convergent pivot point 36. The convergent petal 32 extends axially downstream and radially inwardly from the frame 30 and from the convergent pivot point 36, in the contracted position.

The divergent petal 34 is pivotably attached to a downstream end of the convergent petal 32, at a divergent pivot point 38. The divergent petal 34 is pivotably attached to a linkage 40 at a point on the divergent petal 34 downstream of the divergent pivot point 38. The linkage 40 is pivotably attached to a second extension 30c which extends radially inwardly from the annular portion 30a of the frame 30, at a location on the annular portion 30a downstream of the first extension 30b. The divergent petal 34 is connected to the linkage 40 and convergent petal 32 such that it extends axially downstream and radially outwardly form the divergent pivot point 38.

The frame 30, convergent petal 32, divergent petal 34 and linkage 40 therefore form a four-bar linkage, such that pivoting movement of the convergent petal 32 induces predictable pivoting movement of the divergent petal 34. Whilst all members of the four-bar linkage are of constant length, the four-bar linkage is said to have one degree of freedom (i.e. such that for each angular position of the convergent petal 32 there is a single corresponding angular position of the divergent petal 34).

The linkage 40 in this example is a thrust linkage comprising a telescopic extension. The thrust linkage 40 is actuatable to change in length, so that the pivoting movement of the divergent petal 34 in response to pivoting movement of the convergent petal 32 can be adjusted, thereby providing a second degree of freedom in the four-bar linkage.

The nozzle 20 further comprises a unison ring 44 disposed radially outwardly of the convergent pivot point 36. The unison ring 44 is annular and extends around the longitudinal axis 50 within the annular portion 30a of the frame 30. A cam 46 is fixedly attached to the unison ring 44 and extends axially downstream and radially inwards from the unison ring 44, such that it is disposed radially outwardly from the convergent petal 32. Since the cam 46 is fixedly attached to the unison ring 44, it cannot translate or rotate with respect to the unison ring 44. The cam 46 defines a curved, concave working surface 48 on a radially inner side of the cam 46 (i.e. the radius of curvature of the cam 46 is located radially inward of the cam 46 within the nozzle 20, with respect to the longitudinal axis 50).

A follower roller 42 is fixed to the convergent petal 32 on a radially outer side of the convergent petal 32 (i.e. with respect to the longitudinal axis 50). The working surface 48 of the cam 46 is configured to engage the follower roller 42, such that contact is maintained between the cam 46 and the follower roller 42. It will be appreciated that in use, aerodynamic forces act on the convergent petal 32 so that the follower roller 42 is urged against the cam 46, as explained in further detail below.

The convergent petal 32 defines a chord length along the convergent petal 32 from the convergent pivot point 36 to the divergent pivot point 38. The follower roller 42 in this example is fixed at 50% of the chord length from the convergent pivot point 36. In other examples, the follower roller may be fixed to the convergent petal at any suitable location, for example between 40-80% of the chord length from the convergent pivot point.

During use, air flow through the exhaust nozzle is directed radially inward by the convergent petal 32, and permitted to flow radially outward past the divergent petal 34. Therefore, the air flow exerts a force on the convergent petal 32 as it is directed radially inward. This force is transferred through the follower roller 42 to the cam 46 which reacts the force from the convergent petal 32.

The cam 46 is moveable along a travel in an axial direction. Movement of the cam 46 in the axial direction actuates radial movement of the follower roller 42, because the cam 46 and follower roller 42 are engaged. Radial movement of the follower roller 42 pivots the convergent petal 32 about the convergent pivot point 36. Therefore, the pivoting angle of the convergent petal 32 with respect to the longitudinal axis 50 can be controlled by axial movement of the cam 46.

As explained above, the pivoting of the convergent petal 32 induces pivoting of the divergent petal 34 about the divergent pivot point 38 due to the four-bar linkage arrangement.

In this example, there are a plurality of cams 46 such that there is a cam 46 for every convergent petal 32 around the nozzle 20. In other examples, there may be fewer cams, such as one cam for every two convergent petals. The convergent petals for which there is no corresponding cam may then be coupled to an adjacent convergent petal which does have a corresponding cam, such that pivoting movement of the adjacent convergent petal induces identical movement of the convergent petal without a corresponding cam.

The unison ring 44, which is fixedly attached to the cam 46, is moveable in an axial direction. Around the circumference of the nozzle 20, the plurality of cams 46 are fixed to the unison ring 44 such that axial movement of the unison ring actuates corresponding axial movement of each of the plurality of cams 46. Therefore, each of the plurality of convergent petals 32 can be actuated to pivot by a corresponding amount by axially moving the unison ring 44, and the amounts may be substantially identical with sufficient control of manufacturing tolerances.

Axial movement of the unison ring 44 is controlled by a plurality of actuators 52. In this example, there are four actuators distributed around and within the nozzle 20 (only two are shown). In other examples, there may be any suitable number of actuators distributed around the nozzle to move the unison ring axially. The actuators 52 in this example are in the form of telescopic cylinders, which can move axially between a fully retracted position, and a fully extended position.

As explained above, FIG. 2 shows the nozzle 20 in a contracted configuration. In the contracted configuration, the actuator 52 is in a fully retracted position, such that the unison ring 44 and cam 46 are in a furthest upstream position. A downstream part of the cam 46 is therefore engaged, and in contact with the follower roller 42, such that the convergent petal 32 is in the contracted position. It will be appreciated that the total force exerted on the convergent petal 32 will tend to be largest in use (for given turbine exit flow conditions) when the convergent petal 32 is in the contracted position, because it is at a maximum convergence corresponding to a maximum change in direction of the air flow through the nozzle 20.

Figure 3:
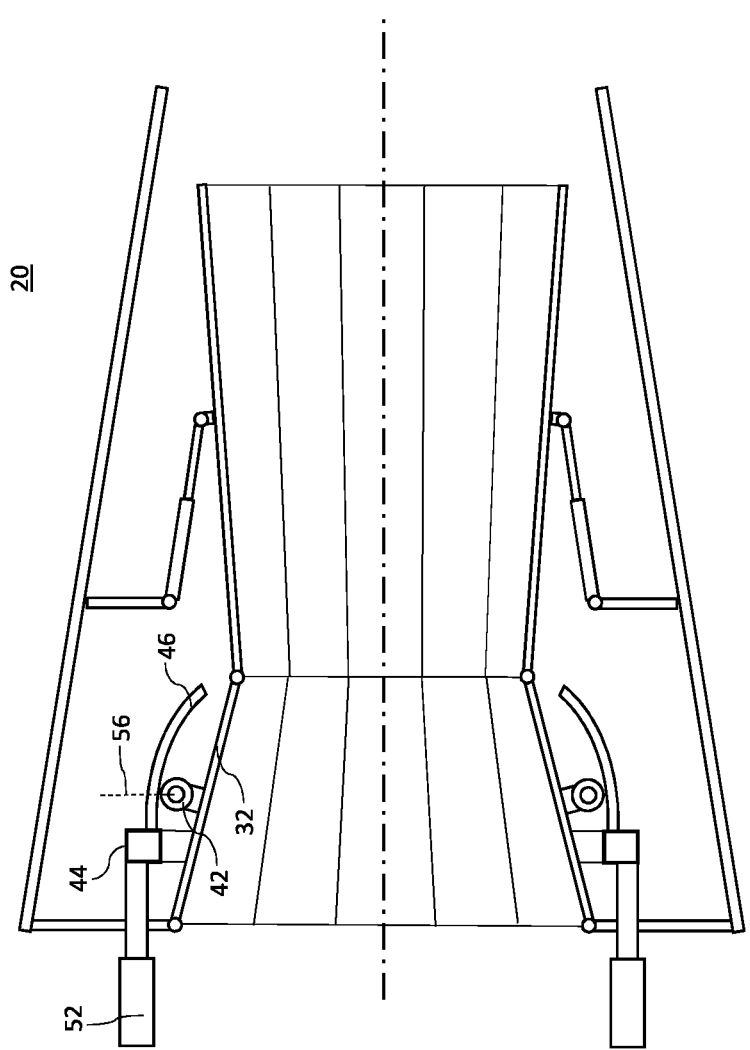
FIG. 3 schematically shows a longitudinal cross-section of the exhaust nozzle in FIG. 2 in an expanded configuration.

FIG. 3 shows the example exhaust nozzle 20 of FIG. 2 in an expanded configuration. In the expanded configuration, the convergent petal 32 is in an expanded position, in which it is pivoted furthest radially outward. The convergent petal 32 in the expanded position is angled radially inwardly at an angle of approximately 10 degrees with respect to the longitudinal axis 50. In other examples, the angle of the convergent petal with respect to the longitudinal axis in the expanded position may be more than 10 degrees, such as at least 15 degrees or at least 20 degrees.

In the expanded configuration, the actuator 52 is fully extended so that the unison ring 44 and cam 46 are in a furthest downstream position. An upstream part of the cam 46 is therefore engaged, and in contact with the follower roller 42, such that the convergent petal 32 is in the expanded position.

Axial movement of the cam 46 is therefore controlled by extension and retraction of the actuators 52, and the cam 46 is moveable along a travel between the contracted configuration (FIG. 2) and the expanded configuration (FIG. 3), in which the cam 46 is in a respective contracted position and expanded position.

The concave working surface 48 of the cam 46 ensures that a contact angle between the follower roller 42 and the cam 46 varies along the travel to thereby vary a radial component of the force from the convergent petal 32 reacted by the cam 46.

Referring back to FIG. 2, a contact angle of a contact line 54 between the cam 46 and the follower roller 42 in the contracted configuration is approximately 45 degrees with respect to the longitudinal axis 50. This is lower than in previously considered systems due to the concave profile of the working surface 48 of the cam 46. This reduces the radial load transferred to the cam 46 and the unison ring 44 in the contracted configuration compared to previously considered systems.

Since the convergent petal 32 experiences the highest forces in the contracted position, the lower contact angle between the cam 46 and follower roller 42 in the contracted configuration reduces the maximum radial load transferred to the cam 46, and to the unison ring 44 in use. This enables a weight saving, as the cams 46 and the unison ring 44 can be made more lightweight. This is particularly advantageous in examples in which there is no unison ring, for example for a 2D non-axisymmetric nozzle, as the radial load cannot be constrained in a hoop continuous component, such that the radial loads must be reduced for the same weight nozzle.

As can be seen in FIG. 3, the concave working surface 48 of the cam 46 is configured so that a contact angle of a contact line 56 between the cam 46 and the follower roller 42 in the expanded position is approximately 90 degrees with respect to the longitudinal axis 50. In other examples, the contact angle in the expanded position may be between 80 to 100 degrees. This ensures that the axial load which is transferred to the cam 46, and therefore to the unison ring 44 from the convergent petal 32, is low or tends to zero in the expanded configuration.

Further, fixing the follower roller 42 to the convergent petal 32 between 40-80% along the chord length of the convergent petal 32 reduces the radial load on the unison ring 44 in the convergent position because a moment arm between the convergent pivot point 36 and the contact point between the cam 46 and the follower roller 42 is increased compared with previously considered arrangements. A moment about the convergent pivot point 36 from the pressure of the gas on the convergent petal 32 must be reacted by the cam 46 at the contact point between the cam 46 and the follower roller 42. The reacting moment of the cam 46 is therefore achieved with a lower reaction force if the moment arm is increased, and the reacting moment of the cam 46 is achieved with a higher reaction force if the moment arm is reduced.

The applicant has found that mounting the follower roller 42 at a position less than 40% along the chord length of the convergent petal 32 from the convergent pivot point 36 results in a rapid increase in radial load on the unison ring 44 and actuator 52 in the contracted configuration due to the decreasing moment arm. In contrast, although the radial load reduces as the distance of mounting the follower roller 42 from the convergent pivot point 36 increases, the applicant has found that mounting it further than 80% along the chord length from the convergent pivot point results in clashes between the follower roller and surrounding components in use.

In this example, a radial ratio of a radius of the follower roller to the radius of curvature of the cam is approximately 0.1. In other examples, the ratio may be between 0.05 and 0.2. The applicant has found that a ratio over 0.2 results in a rapidly decreasing contact angle between the cam 46 and the follower roller 42 with respect to the longitudinal axis, such that the axial load transferred to the unison ring 44 and actuators 52 rapidly increases towards the contracted configuration. The applicant has also found that a ratio of below 0.05 results in the cam 46 being too long in a typical nozzle such that it would collide with the divergent petal 34 when moving towards the expanded configuration. The radius of curvature in this example is the radius of curvature in a plane intersecting the longitudinal axis 50, which may be the engine centreline axis 11.

In some examples, the radius of curvature of the cam may not be constant. The radius of curvature used in such examples to calculate the comparable radial ratio is the average radius of curvature along curved portions of the cam for lower limit of 0.05 and the maximum radius of curvature along curved portions of the cam for the upper limit of 0.2.

Although it has been described that the frame comprises discrete radially inward extending extensions to which the convergent petal and linkage are coupled, the extensions may be in the form of annular extensions, which are continuous around the circumference of the nozzle and frame, or any suitable support structure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. An exhaust nozzle for a gas turbine engine, the exhaust nozzle comprising a frame extending along a longitudinal axis and the exhaust nozzle comprising:
   a convergent petal pivotably attached at a convergent pivot point to the frame and extending axially downstream and radially inward from the frame;
   a follower roller fixed to the convergent petal on a radially outer side of the convergent petal; and
   a cam defining a working surface configured to engage the follower roller to react a force from the convergent petal;
   wherein the cam is movable along a travel in an axial direction to actuate radial movement of the follower roller to pivot the convergent petal, whereby the cam defines a concave working surface such that a contact angle between the follower roller and the cam varies along the travel to thereby vary a radial component of the force reacted by the cam, and wherein the cam is moveable between a contracted position in which the cam is in a furthest upstream position and an expanded position in which the cam is in a furthest downstream position, and wherein the cam is configured so that a contact angle between the cam and the follower roller in the expanded position is between 80-100 degrees from the longitudinal axis.

2. The exhaust nozzle according to claim 1, wherein the divergent petal is connected to the frame by a linkage such that the frame, convergent petal, divergent petal and linkage form a four-bar linkage.

3. The exhaust nozzle according to claim 2, wherein the linkage is a thrust linkage which is actuatable to change length.

4. The exhaust nozzle according to claim 1, wherein the convergent petal defines a chord length from the convergent pivot point to the divergent pivot point, and wherein the roller is fixed between 40-80% along the chord length of the convergent petal from the convergent pivot point.

5. The exhaust nozzle according to claim 1, wherein the cam is configured so that the contact angle between the cam and the follower roller in the expanded position is between 85-95 degrees from the longitudinal axis.

6. The exhaust nozzle according to claim 1, comprising a plurality of convergent petals angularly distributed around the exhaust nozzle, each comprising respective rollers, and the exhaust nozzle comprising a corresponding plurality of cams circumferentially spaced around the exhaust nozzle and configured to maintain engagement with a respective roller.

7. The exhaust nozzle according to claim 6, wherein the cam is fixed to a unison ring, and wherein axial movement of the cam is actuated by axial movement of the unison ring.

8. The exhaust nozzle according to claim 6, wherein there are a plurality of divergent petals corresponding to the plurality of convergent petals.

9. A gas turbine engine comprising an exhaust nozzle according to claim 1.

10. An exhaust nozzle for a gas turbine engine, the exhaust nozzle comprising a frame extending along a longitudinal axis and the exhaust nozzle comprising:
    a convergent petal pivotably attached at a convergent pivot point to the frame and extending axially downstream and radially inward from the frame;
    a divergent petal pivotably attached at a divergent pivot point to a downstream end of the convergent petal, the divergent petal extending axially downstream and radially outward from the divergent pivot point;
    a follower roller fixed to the convergent petal on a radially outer side of the convergent petal; and
    a cam defining a working surface configured to engage the follower roller to react a force from the convergent petal,
    wherein the cam is movable along a travel in an axial direction to actuate radial movement of the follower roller to pivot the convergent petal, whereby the cam defines a concave working surface such that a contact angle between the follower roller and the cam varies along the travel to thereby vary a radial component of the force reacted by the cam.

11. An exhaust nozzle for a gas turbine engine, the exhaust nozzle comprising a frame extending along a longitudinal axis and the exhaust nozzle comprising:
    a convergent petal pivotably attached at a convergent pivot point to the frame and extending axially downstream and radially inward from the frame;
    a follower roller fixed to the convergent petal on a radially outer side of the convergent petal; and
    a cam defining a working surface configured to engage the follower roller to react a force from the convergent petal,
    wherein the cam is movable along a travel in an axial direction to actuate radial movement of the follower roller to pivot the convergent petal, whereby the cam defines a concave working surface such that a contact angle between the follower roller and the cam varies along the travel to thereby vary a radial component of the force reacted by the cam, and wherein a ratio of a radius of the follower roller to an average radius of curvature of the cam is 0.05 or above.

12. An exhaust nozzle for a gas turbine engine, the exhaust nozzle comprising a frame extending along a longitudinal axis and the exhaust nozzle comprising:

a convergent petal pivotably attached at a convergent pivot point to the frame and extending axially downstream and radially inward from the frame;

a follower roller fixed to the convergent petal on a radially outer side of the convergent petal; and a cam defining a working surface configured to engage the follower roller to react a force from the convergent petal, wherein the cam is movable along a travel in an axial direction to actuate radial movement of the follower roller to pivot the convergent petal, whereby the cam defines a concave working surface such that a contact angle between the follower roller and the cam varies along the travel to thereby vary a radial component of the force reacted by the cam, and wherein a ratio of a radius of the follower roller to a maximum radius of curvature of the cam is 0.2 or below.

\* \* \* \* \*